United States Patent [19]

Lewis

[11] Patent Number: 4,733,583

[45] Date of Patent: Mar. 29, 1988

[54] LUG WRENCH

[76] Inventor: Robert W. Lewis, Box 158, Garden Valley, Calif. 95633

[21] Appl. No.: 820,961

[22] Filed: Jan. 22, 1986

[51] Int. Cl.$^4$ .......................... B25G 1/00; B25B 13/06
[52] U.S. Cl. ...................................... 81/177.2; 7/100; 81/177.6; 81/177.7
[58] Field of Search ...... 81/177.1, 177.2, 177.5–177.9, 81/121.1, 180.1, 323–324, 331–332; 7/100; 16/374, 377; 403/157, 113

[56] References Cited

U.S. PATENT DOCUMENTS

| | | |
|---|---|---|
| 1,286,161 | 11/1918 | Wagner . |
| 1,453,984 | 5/1923 | Norlund . |
| 1,531,732 | 3/1925 | Burkholder . |
| 1,715,902 | 6/1929 | Countryman . |
| 1,721,756 | 7/1929 | Walker . |
| 1,733,642 | 10/1929 | Beduorz .......................... 81/177.6 X |
| 1,963,564 | 6/1934 | Smith et al. .............................. 81/332 |
| 2,476,364 | 7/1949 | Gaines . |
| 2,504,345 | 4/1950 | Nellis ....................................... 7/100 |
| 3,156,143 | 11/1964 | Wolf ..................................... 81/177.6 |
| 4,070,931 | 1/1978 | Florko, Jr. . |
| 4,297,916 | 11/1981 | Burroughs ...................... 81/177.2 X |
| 4,596,167 | 6/1986 | White, Jr. .......................... 81/177.2 |

FOREIGN PATENT DOCUMENTS 802015 9/1958 United Kingdom .................... 7/100

Primary Examiner—Debra Meislin
Attorney, Agent, or Firm—Leonard Bloom

[57] ABSTRACT

A lug wrench for loosening and tightening lug nuts on a vehicle wheel having a shaft with a socket at one end and yoke radially extending from the shaft pivotally connected to a moment arm bar such that the shaft can be rotated between a first position at an midpoint of the moment arm bar and the second position substantially at an extremity of the moment arm bar, a remote end of the moment arm bar away from the shaft having a multiplier bar pivotally connected thereto adapted to fold over on to the moment arm bar and attached thereto by means of a retaining clip. When both bars are linearly extended there is mechanical advantage when loosening the lug nut. When the bars are folded upon each other, overtightening is precluded.

16 Claims, 6 Drawing Figures

U.S. Patent  Mar. 29, 1988  4,733,583
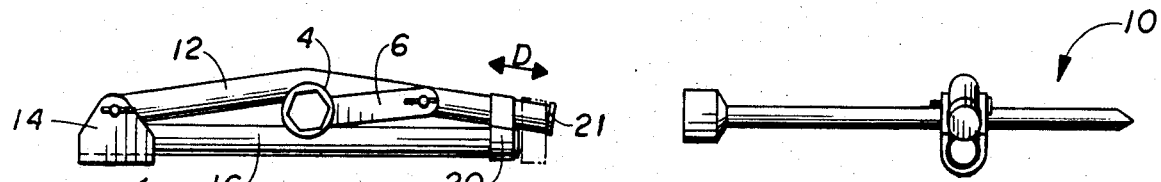
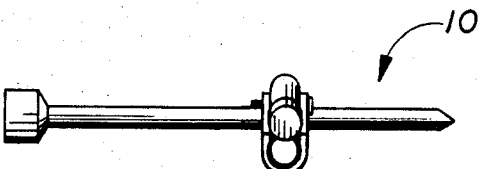
FIG. 1    FIG. 2
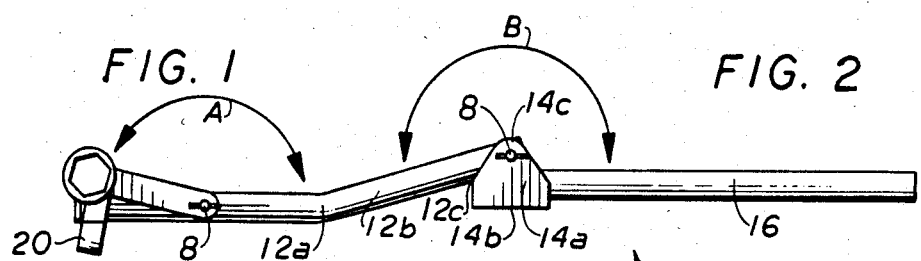
FIG. 3
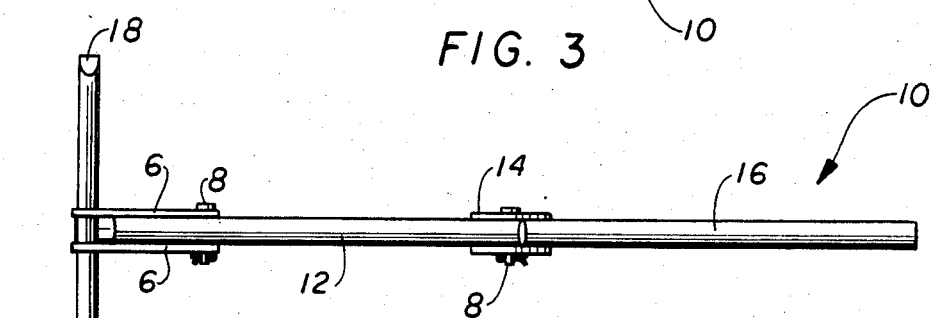
FIG. 4
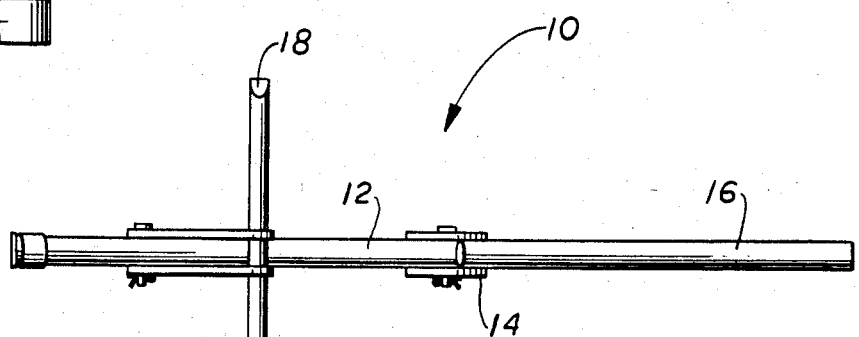
FIG. 5
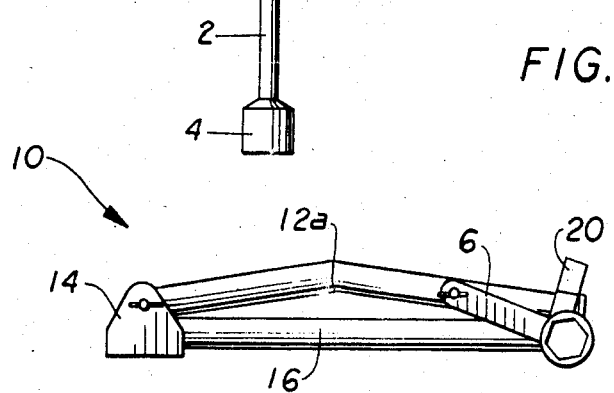
FIG. 6

LUG WRENCH

BACKGROUND OF THE INVENTION

The following invention relates generally to devices for removing and tightening lug nuts which retain vehicle wheels.

FIELD OF THE INVENTION

Roadside repairs on vehicle tires can be a nettlesome problem particularly when the lug nuts are frozen on the wheel. The use of corrosive salt on highways, over-tightening of lug nuts when the tire is installed, and the tire irons traditionally provided as standard equipment on most vehicles can make tire removal difficult if not impossible.

While known prior art devices include providing a lug wrench having a longer moment arm or placing a pipe over the lug wrench handle to effectively increase the moment arm, these devices are characterized in being somewhat larger than the original equipment and do not lend themselves to compact storage in the area provided by the car manufacturer. In addition, a lug wrench having a longer moment arm increases the possibility that the lug can be over tightened on the wheel stud compounding tire replacement problems should the lug be overtightened, breaking the stud.

The following patents are representative of the known prior art of which the inventor is aware;

| | | |
|---|---|---|
| 1,286,161 | Wagner | November 26, 1918 |
| 1,453,989 | Norlund | May 1, 1923 |
| 1,531,732 | Burkholder | March 31, 1925 |
| 1,715,902 | Countryman | June 4, 1929 |
| 1,721,756 | Walker | July 23, 1929 |
| 2,476,364 | Gaines | July 19, 1949 |
| 4,070,931 | Florko, Jr. | January 31, 1978 |

The patent to Florko teaches the use of a lug wrench in which the shaft supporting the socket communicates with two outwardly extending elements, one of which serves as a fulcrum, the other of which serves as a bearing surface, both of which are adapted to coact with a lever arm for enhancing the torque in either direction i.e. tightening or loosening.

The remaining citations show the state of the art further.

SUMMARY OF THE INVENTION

The instant invention is distinguished over the known prior art in that an instrumentality has been provided which provides enhanced torque when the lug wrench is to be used for loosening the lug but precludes the possibility of over tightening by disabling the means by which the moment arm is lengthened when the lug nut is to be tightened.

The device is constructed such that when not in use it has approximately the same dimensions as a conventional cruciform shaped lug wrench for compact storage in the vehicle.

When the device is used for loosening lug nuts, the amount of torque delivered to the lug nut is increased by taking the cruciform shaped lug wrench and unfolding a portion of the wrench which is transverse to the axis of rotation of the lug nut, the unfolding allows hinges to be fixed so that directional rotation required to loosen the lug nut can occur with the lug wrench having a longer moment arm. For tightening, since the hinges on the extended moment arm only achieve a locked position in one direction, the lug wrench will not provide excessive tightening since the extended lever arm will be folded about the hinge lines.

OBJECTS OF THE INVENTION

Accordingly, this invention has as a primary objective providing a tool used for loosening and tightening lug nuts which has an increased amount of torque for loosening, but a limited and decreased amount of torque for tightening.

A further object of this invention contemplates providing a device as characterized above which folds for compact storage and dimensionally is the substantial equivalent of a conventional cruciform shaped lug wrench.

A further object of this invention contemplates providing a device as characterized above which is durable in construction, extremely safe to use, and lends itself to mass production techniques.

A further object of this invention contemplates providing a device as characterized above for increasing the amount of torque delivered to a lug nut when removing a lug nut from its associated wheel lug, and for controlling the amount of force delivered to the lug nut when tightening a lug. More particularly, the device includes a shaft having a socket end adapted to engage the lug nut, the shaft supporting away from the lug socket first and second spaced parallel radially outwardly extending ears defining a yoke, distal ends of which pivotally support a bar at a point one quarter along its length. A medial portion of this bar has a recess adapted to receive the tool shaft therein, and an end of the bar nearest the yoke is fitted with a retaining clip. The remote end of the bar is hinged to a second bar whereby the second bar can be folded over the first bar thereby capturing the shaft there between and the retaining clip can attach the two bars together. The two bar's can be linearly extended on one side of the shaft for maximum leverage when loosening.

A further object of this invention contemplates providing a lug wrench which has a shaft having a socket at one end adapted to overlie and drive the lug, a yoke attached to the shaft extending radially therefrom, an end of the yoke remote from the shaft pivotally supporting a moment arm bar allowing the shaft to pivot between one of two positions: a first position having a quantized torque for tightening and second having an enhanced torque for loosening.

A further object contemplates providing a wrench for loosening and tightening mechanical fasteners including an instrumentality for attaching the wrench to the fastener, a moment arm instrumentality for tightening the fastener a quantized amount formed to the attaching instrumentality, and a moment arm multiplier instrumentality integral to the moment arm instrumentality selectively engagable for loosening the fastener with mechanical advantage in excess of the moment arm instrumentality alone to free difficult fasteners; and an instrumentality for completely precluding the multiplier instrumentality from tightening the fastener to guard against the overtightening the fastener.

BRIEF DESCRIPTION OF THE DRAWING FIGURES

FIG. 1 is an end view of the apparatus according to the present invention when used for spinning a loosened nut on or off a wheel lug and for storing the wrench in a wheel well of a spare tire.

FIG. 2 is a side view thereof.

FIG. 3 is an end view of the apparatus showing how the device unfolds into the fully extended position for maximum torque for loosening a nut.

FIG. 4 is a top plan view of FIG. 3.

FIG. 5 is a top plan view similar to FIG. 4 showing the device in the process of being folded into the nut tightening position shown in FIG. 6.

FIG. 6 shows an alternative to FIG. 1 for tightening a nut whereby greater torque for tightening the nut is provided than for the cruciform position shown in FIG. 1.

DESCRIPTION OF PREFERRED EMBODIMENT

Referring to the drawings now, wherein like reference numerals refer to like parts throughout the various drawing figures, reference numeral 10 is directed to the lug wrench according to the present invention.

The lug wrench 10 includes a shaft 2 having a socket 4 at one end thereof, a remote end having a wedge-shaped pry tip 18 used traditionally to force the hub cap off of the wheel of the vehicle.

Along the length of the shaft 2, a yoke 6 having two spaced parallel ears extends radially outwardly each ear of the yoke spaced a distance sufficient to allow the passage therebetween of a moment arm bar 12 having an inside end and an outside end. Each ear of the yoke 6 is fixed to the shaft 2 and the end of each ear remote from the shaft 2 is pivoted to moment arm bar 12 in the proximity of the outside end by means of a pivot pin 8 extending between the ears and through the bar shaft. Thus, the shaft 2 can pivot about the pin 8 in the direction of the arrow A of FIG. 3. The location of the pivot pin 8 is approximately one quarter along the length of the moment arm bar 12 so that when rotated, the shaft 2 resides substantially at the midpoint of the moment arm bar 12. It is to be noted that the moment arm bar 12 has a bend at its central most portion 12A, with two linear sections extending outwardly therefrom.

One linear section 12B remote from the section which pivotally supports the shaft 2 has an end which pivots about a hinge box 14. The hinge box 14 includes first and second spaced parallel sidewalls 14A, a bottom wall 14B with each sidewall 14A tapering to a centrally located radiused corner 14C which pivotally supports the moment arm bar 12 through a further pivot 8. Thus, the moment arm bar 12 can pivot about the hinge box 14 in the direction of the arrow B.

The hinge box 14 has fixed thereto a multiplier bar 16 extending outwardly therefrom on a side remote from the moment arm bar 12. When the lug wrench 10 is oriented as shown in FIG. 3, a force on the multiplier bar 16 in the direction of the arrow C causes both the moment arm bar and multiplier bar to act as a rigid link since an abutment the moment arm bar 12 abuts against the hinge box 14 at point 12C in an unyielding fashion. This provides rotation about the socket 4 as shown in FIG. 3, and will loosen the lug nut. Conversely, when force is applied on the multiplier bar 16 in a direction opposite from the arrow C, the multiplier bar will tend to pivot about the pivot points 8 and will not provide increased torque. This aspect is obtained because the shaft 2 is parallel to the pivot pin 8.

There are two possible orientations for the lug wrench 10 when used in a tightening mode, both positions of which are best shown in FIGS. 1 and 6 respectively. Referring to FIG. 1, an orientation is shown in which the yoke ears 6 are rotated such that the moment arm bar 12 and the multiplier bar 16 together straddle the shaft 2 and its socket 4. Note that the overall length of the multiplier bar 16 is somewhat less than the overall length of the moment arm bar 12 so that a retaining clip 20 can be slid along the direction of the arrow D of FIG. 1 to fix the two bars together. The clip 20 is formed from to somewhat circular bands, joined together to form a FIG. 8. A first band is constrained to slide on the moment arm bar 12 at an extremity remote from the hinge box 14 by a flange 21 so that the clip 20 can slide along the linear length of moment arm bar 12 between the yoke pivot 8 and flange 21. As shown in FIG. 1, the other circular portion of the clip 20 can slide over an end of the multiplier bar thereby providing a unitized cruciform shaped lug wrench.

FIG. 6 reflects an embodiment where the shaft 2 is not placed in the bend 12A midway along the moment arm bar 12, but is rotated to an extreme end of the moment arm bar 12 remote from the hinge box 14. The length of the multiplier bar 16 is shortened sufficiently to allow the portion of the shaft 2 extending between each yoke ear 6 to abut against the free end of the multiplier bar 16 so that the multiplier bar nests between the two ears of the yoke 6 and retains the shaft 2 in this position. The configuration of FIG. 6 provides a slightly longer moment arm than that which is shown in FIG. 1, and can provide additional torque when tightening, where as FIG. 1 lends itself to speed turning of the lug nut.

Having thus described the invention, it should be apparent that numerous structural modifications are contemplated as being a part of this invention as set hereforth herein above and is defined hereinbelow by the claims.

I claim:

1. A lug wrench comprising, in combination:
    a shaft having a socket at one end adapted to overlie and drive a nut on and off a lug,
    a moment arm bar having an inside end and an outside end,
    a yoke attached to said shaft, extending radially therefrom, an end of said yoke remote from said shaft pivotally connected by pivot means to said moment arm bar in the region between the middle and the outside end of said moment arm bar, said pivot means pivotable about an axis parallel to the rotational axis of said socket allowing said shaft to pivot between a first position and a second position, said first position including said shaft lying approximately midway along the length of said moment arm bar enabling a first torque upon tightening the nut, and said second position including said shaft lying near the outside end of said moment arm bar enabling enhanced torque upon loosening the nut, the second-position allowing for greater torque for loosening the nut than the first-position for tightening the nut,
    and moment arm multiplier means including a rotation-limiting hinge having stop means for limiting rotation of said hinge, said hinge pivotally connected to the inside end of said moment arm bar and pivotable about an axis parallel to the rotational axis of said socket, said moment arm multiplier means for enabling loosening of the nut with enhanced torque in excess of said moment arm bar alone to free difficult fasteners when said multiplier means is unfolded by pivotally rotating said multiplier means relative to said moment arm bar to lengthen the lever arm with respect to said moment arm bar, wherein said multiplier means is folded over said moment arm bar when said shaft is in said first position whereby said shaft is substantially midway along the length of both said moment arm bar and said multiplier means for tightening and speed turning the nut.

2. The device of claim 1, wherein a retaining clip is slidably provided on an end of said moment arm bar between a pivotal connection of said yoke thereto and a free end thereof, said retaining clip being of substantially Figure 8 configuration adapted to slidably engage and retain said multiplier bar.

3. The device of claim 2 wherein said moment arm bar has a bend centrally disposed thereof with two linear sections extending away therefrom to accomodate said shaft thereat.

4. The device of claim 1, wherein said moment arm and multiplier bars are linearly extended and said shaft is in said second position to provide enhanced leverage for loosening.

5. A lug wrench comprising, in combination:
a shaft having a socket at one end adapted to overlie and drive a nut on and off a lug,
a moment arm bar having an inside end and an outside end,
a yoke attached to said shaft, extending radially therefrom, an end of said yoke remote from said shaft pivotally connected by pivot means to said moment arm bar in the region between the middle and the outside end of said moment arm bar, said pivot means pivotable about an axis parallel to the rotational axis of said socket allowing said shaft to pivot between a first position and a second position, said first position including said shaft lying approximately midway along the length of said moment arm bar enabling a first torque upon tightening the nut, and said second position including said shaft lying near the outside end of said moment arm bar enabling enhanced torque upon loosening the nut, the second-position allowing for greater torque for loosening the nut than the first-position for tightening the nut,
and moment arm multiplier means including a rotation-limiting hinge having stop means for limiting rotation of said hinge, said hinge pivotally connected to the inside end of said moment arm bar and pivotable about an axis parallel to the rotational axis of said socket, said moment arm multiplier means for enabling loosening of the nut with enhanced torque in excess of said moment arm bar alone to free difficult fasteners when said multiplier means is unfolded by pivotally rotating said multiplier means relative to said moment arm bar to lengthen the lever arm with respect to said moment arm bar,
wherein said multiplier means is capable of being folded over said moment arm bar when said shaft and socket are in said second position with said shaft being at respective free ends of both said multiplier means and said moment arm bar and said multiplier means is nested between ears of said yoke with the free end of multiplier bar retaining said shaft in said second position allowing both loosening and tightening with a moment arm defined by the overall length of said multiplier means.

6. The device of claim 5 wherein said moment arm bar and said multiplier bar are interconnected by a hinge box having a bottom wall, two upwardly extending sidewalls which each terminate in a rounded centrally disposed top corner, said moment arm bar pivotally connected thereat and constrained to pivot in only one direction due to abutment against said hinge box bottom wall.

7. The device of claim 1, wherein said moment arm bar and said multiplier bar are interconnected by a hinge box having a bottom wall, two upwardly extending sidewalls which each terminate in a rounded centrally disposed top corner, said moment arm bar pivotally connected thereat.

8. A wrench for loosening and tightening mechanical fasteners, comprising in combination:
means for engaging a fastener,
moment arm means including a yoke means pivotally connected by a pivot means to said engaging means said pivot means pivotable about an axis parallel to the rotational axis of said engaging means, said moment arm means having an inside end and an outside end, said moment arm means for enabling tightening of the fastener with a first amount of torque, said moment arm means having said yoke means pivotally connected thereto in the region between the middle and the outside end of said moment arm means,
and moment arm multiplier means including a rotation-limiting hinge having stop means for limiting rotation of said hinge, said hinge pivotally connected to the inside end of said moment arm means and pivotable about an axis parallel to the rotational axis of said engaging means, said multiplier means for enabling loosening of the fastener with enhanced torque in excess of said moment arm means alone to free difficult fasteners when said multiplier means is unfolded by pivotally rotating said multiplier means relative to said moment arm means to lengthen the lever arm with respect to said moment arm means, and
said rotation-limiting hinge for precluding said multiplier means from tightening the fastener to guard against overtightening the fastener when said multiplier means undergoes folding by rotating said multiplier means around the pivotal connection to said moment arm means to shorten the lever arm with respect to said moment arm means,
wherein said multiplier means is folded over said moment arm means when said fastener engaging means is in a position whereby said fastener engaging means is substantially midway along the length of both said moment arm means and said multiplier means for tightening and speed turning the fastener.

9. The device of claim 8, wherein said moment arm means and said multiplier means are interconnected by a hinge box having a bottom wall, two upwardly extending sidewalls which each terminate in a rounded centrally disposed top corner, said moment arm means pivotally connected thereat.

10. The device of claim 8, wherein said moment arm means and said multiplier means are interconnected by a hinge box having a bottom wall, two upwardly extending sidewalls which each terminate in a rounded centrally disposed top corner, said moment arm means pivotally connected thereat.

11. The device of claim 8, wherein a retaining clip is slidably provided on an end of said moment arm means between a pivotal connection of a yoke thereto and a free end thereof, said retaining clip being of substantially FIG. 8 configuration adapted to slidably dispose upon and engage said multiplier means.

12. The device of claim 11 wherein said moment arm means has a bend centrally disposed thereof with two linear sections extending away therefrom to accomodate said attaching means thereat.

13. The device of claim 8, wherein said moment arm means and said multiplier means are linearly extended and said attaching means is outboard said moment arm means to provide enhanced leverage for loosening.

14. A wrench for loosening and tightening mechanical fasteners, comprising in combination:
means for engaging a fastener,
moment arm means including a yoke means pivotally connected by a pivot means to said engaging means said pivot means being pivotable about an axis parallel to the rotational axis of said engaging means, said moment arm means having an inside end and an outside end, said moment arm means for enabling tightening of the fastener with a first amount of torque, said moment arm means having said yoke means pivotally connected thereto in the region between the middle and the outside end of said moment arm means,
and moment arm multiplier means including a rotation-limiting hinge having stop means for limiting rotation of said hinge, said hinge pivotally connected to the inside end of said moment arm means and pivotable about an axis parallel to the rotational axis of said engaging means, said multiplier means for enabling loosening of the fastener with enhanced torque in excess of said moment arm means alone to free difficult fasteners when said multiplier means is unfolded by pivotally rotating said multiplier means relative to said moment arm means to lengthen the lever arm with respect to said moment arm means, and
said rotation-limiting hinge for precluding said multiplier means from tightening the fastener to guard against overtightening the fastener when said multiplier means undergoes folding by rotating said multiplier means around the pivotal connection to said moment arm means to shorten the lever arm with respect to said moment arm means,
wherein said multiplier means is capable of being folded over said moment arm means and said fastener engaging means is in a second position with said fastener engaging means being at respective free ends of both said multiplier means and said moment arm means and said multiplier means is nested between ears of said yoke abutting against said fastener engaging means and said moment arm means with a free end of said multiplier means retaining said fastener engaging means in said second position allowing both loosening and tightening with a moment arm defined by the overall length of said multiplier means.

15. A lug wrench comprising, in combination:
a shaft having a socket at one end adapted to overlie and drive a nut on and off a lug,
a moment arm bar having an inside end and an outside end,
a yoke attached to said shaft, extending radially therefrom, an end of said yoke remote from said shaft pivotally connected by pivot means to said moment arm bar in the region between the middle and the outside end of said moment arm bar, said pivot means pivotable about an axis parallel to the rotational axis of said socket allowing said shaft to pivot between a first position and a second position, said first position including said shaft lying approximately midway along the length of said moment arm bar enabling a first torque upon tightening the nut and said second position including said shaft lying being at the outside end of said moment arm bar, and
and moment arm multiplier means including a rotation-limiting hinge having stop means for limiting rotation of said hinge, said hinge pivotally connected to the inside end of said moment arm bar and pivotable about an axis parallel to the rotational axis of said socket, said moment arm multiplier means for enabling loosening of the nut with enhanced torque in excess of said moment arm bar alone when in the second position to free difficult fasteners when said multiplier means is unfolded by pivotally rotating said multiplier means relative to said moment arm bar to lengthen the lever arm with respect to said moment arm bar,
said second position effective for applying substantially negligible leverage if an attempt is made to tighten the nut when said multiplier bar is extended with respect to said moment bar, said negligible leverage arising from the fact that the lever arm provided by said multiplier bar and said moment bar is substantially eliminated when said multiplier bar is rotated around the pivotal rotation-limiting hinge connection to said moment bar when an attempt is made to tighten a nut with said multiplier bar is in the unfolded orientation, and said second position for enabling the application of reduced leverage upon the nut for either tightening or loosening the nut, when said multiplier bar is folded over and secured against said moment arm bar providing a reduced lever arm in comparison to the unfolded position of said multiplier bar, said multiplier bar serving to retain said shaft in said second position when said multiplier bar is folded over said moment arm bar and secured against said moment bar by the free end of said multiplier bar.

16. A lug wrench comprising, in combination:
a shaft having a socket at one end adapted to overlie and drive a nut on and off a lug,
a moment arm bar having an inside end and an outside end,
a yoke attached to said shaft, extending perpendicularly therefrom, an end of said yoke remote from said shaft pivotally connected to said moment bar in the region between the middle and the outside end of said moment arm bar by pivot means pivotable about an axis parallel to said socket allowing said shaft to pivot between a first position and a second position, said first position including said shaft lying along the length of said moment arm bar enabling a first torque upon tightening the nut, and said second position including said shaft lying near the outside end of said moment arm bar enabling enhanced torque upon loosening the nut, the second-position allowing for greater torque for loosening the nut than the first-position for tightening the nut, and moment arm multiplier means including an abutment capable of contacting said moment arm bar when said multiplier means is unfolded, said multiplier means further including a hinge, said hinge pivotally connected to the inside end of said moment arm bar by pivot means pivotable about an axis parallel to said socket, said multiplier means for enabling loosening of the nut with enhanced torque in excess of said moment arm bar alone to free difficult fasteners when said multiplier means is unfolded by pivotally rotating said multiplier means relative to said moment arm bar to lengthen the lever arm with respect to said moment arm bar and when said abutment is in contact with said moment arm bar.

* * * * *